United States Patent

Fukasawa et al.

[11] Patent Number: 5,529,151
[45] Date of Patent: Jun. 25, 1996

[54] BAND BRAKE DEVICE

[75] Inventors: Toshihide Fukasawa; Yoshifumi Fujita; Yasunari Mochizuki, all of Fuji, Japan

[73] Assignee: Jatco Corporation, Fuji, Japan

[21] Appl. No.: 242,439

[22] Filed: May 13, 1994

[30] Foreign Application Priority Data

May 14, 1993 [JP] Japan .................................. 5-136521
Mar. 28, 1994 [JP] Japan .................................. 6-082586

[51] Int. Cl.$^6$ .............................. F16D 49/12; F16H 61/28
[52] U.S. Cl. .................. 188/77 W; 188/249; 188/250 H
[58] Field of Search .............................. 188/77 R, 77 W, 188/250 H, 249; 192/80

[56] References Cited

FOREIGN PATENT DOCUMENTS

| | | | |
|---|---|---|---|
| 1159276 | 5/1962 | Germany | 188/77 W |
| 2-6853 | 1/1990 | Japan . | |
| 4-107329 | 4/1992 | Japan | 188/77 W |
| 1407113 | 9/1975 | United Kingdom | 188/77 W |

Primary Examiner—Robert J. Oberleitner
Assistant Examiner—Chris Schwartz
Attorney, Agent, or Firm—Foley & Lardner

[57] ABSTRACT

A band brake device used to apply a brake to a rotating drum forming part of an automatic transmission of an automotive vehicle. The band brake device comprises a brake band wrapped around the outer peripheral surface of the rotating drum. A lining material is bonded to the inner surface of the brake band to be contactable with the outer peripheral surface of the rotating drum. The brake band is provided at its movable end with a bracket which is adapted to be pushed by a piston of a hydraulic servo device. The bracket is connected through a link to a casing, so that the movable end is guided to be move in a direction generally parallel with a tangential direction of the outer peripheral surface of the drum at a position adjacent the movable end.

11 Claims, 8 Drawing Sheets

BAND BRAKE DEVICE

BACKGROUND OF THE INVENTION

1. Field of the Invention

This invention relates to improvements in a band brake device in an automatic transmission of an automotive vehicle, and more particularly to a device for operating a brake band in such a manner as to prevent a high bearing pressure from being locally applied to the surface of a rotating drum.

2. Description of the Prior Art

It is well known that a band brake device is used as one of frictionally engaging elements in an automatic transmission of an automotive vehicle. The band brake device includes a brake band to which a lining material is bonded. The brake band is provided at its opposite ends with respective brackets. The brake band is wrapped around the outer peripheral surface of a rotating drum so that the lining material is contactable with the drum outer peripheral surface. The bracket (fixed-side bracket) at one end of the brake band is fixedly secured to an anchor end pin, whereas the other bracket (operative-side bracket) is connected to a piston rod of a hydraulic servo device. Accordingly, upon operating the servo device, the brake band is tightened on the drum outer peripheral surface, thereby stopping rotation of the drum.

Such a band brake device is disclosed, for example, in Japanese Utility Model Provisional Publication No. 2-6853, and arranged as follows: One of the fixed- and operative-side brackets is provided with a projection section which protrudes toward the other bracket and formed along the outer peripheral surface of the drum. The other bracket is provided with a groove section which slidably engages with the projection section. Accordingly, a relative displacement is made between the fixed- and operative-side brackets along the outer peripheral surface of the drum under slidable movement between the projection and groove sections.

However, drawbacks have been encountered in the above discussed conventional brand brake device. That is, when a load is applied from the hydraulic servo device to the operative-side bracket, a rotation moment is developed around a connecting point between the operative-side bracket and the brake band because of a high rigidity of the operative side bracket. Accordingly a load in the direction of the drum is applied to the operative-side bracket of the brake band. As a result, a bearing pressure at this location to which the load is applied becomes high thereby suddenly reducing the thickness of oil film at this location. This causes a sudden shock during shifting of the automatic transmission while largely changing a shift time with age.

SUMMARY OF THE INVENTION

It is an object of the present invention to provide an improved band brake device in an automatic transmission, which can effectively overcome the drawbacks encountered in conventional band brake devices.

Another object of the present invention is to provide an improved band brake device in an automatic transmission, which can effectively prevent a sudden shock from generating during shifting of the automatic transmission while suppressing small a changes in shifting time with age.

A further object of the present invention is to provide an improved band brake device in an automatic transmission, in which a high bearing pressure can be prevented from being locally applied to the outer peripheral surface of a rotating drum flows maintaining a suitable thickness of oil film on the outer peripheral surface of the drum.

A band brake device of the present invention comprises a brake band wrapped around an outer peripheral surface of a rotatable drum. The brake band has a first end to which a movable-side bracket is connected, and a second end connected to a stationary member. A piston of a hydraulic servo device is operatively connected to the movable-side bracket so that a load is applied from the piston to the movable-side bracket. A guiding device is provided to guide the movable-side bracket to move in a direction generally parallel with a tangential direction of an outer peripheral surface of the rotatable drum at a position adjacent the movable-side bracket when the movable-side bracket receives the load from the piston.

By virtue of the guiding device, the movable-side bracket at the movable (first) end of the brake band can be moved in the direction generally parallel with the tangential direction of the outer peripheral surface of the drum at the position adjacent the movable-side bracket when the movable-side bracket is driven by the hydraulic servo device. Accordingly, the movable end of the brake band is prevented from being locally strongly pressed against the outer peripheral surface of the drum. As a result, a high bearing pressure is prevented from being locally applied to the drum outer peripheral surface, thereby avoiding generation of a sudden shock during automatic transmission shifting while reducing a change in shifting time with age.

BRIEF DESCRIPTION OF THE DRAWINGS

In the drawings, like reference numerals designate like elements and parts, in which.

DETAILED DESCRIPTION OF THE INVENTION

Figure 1:
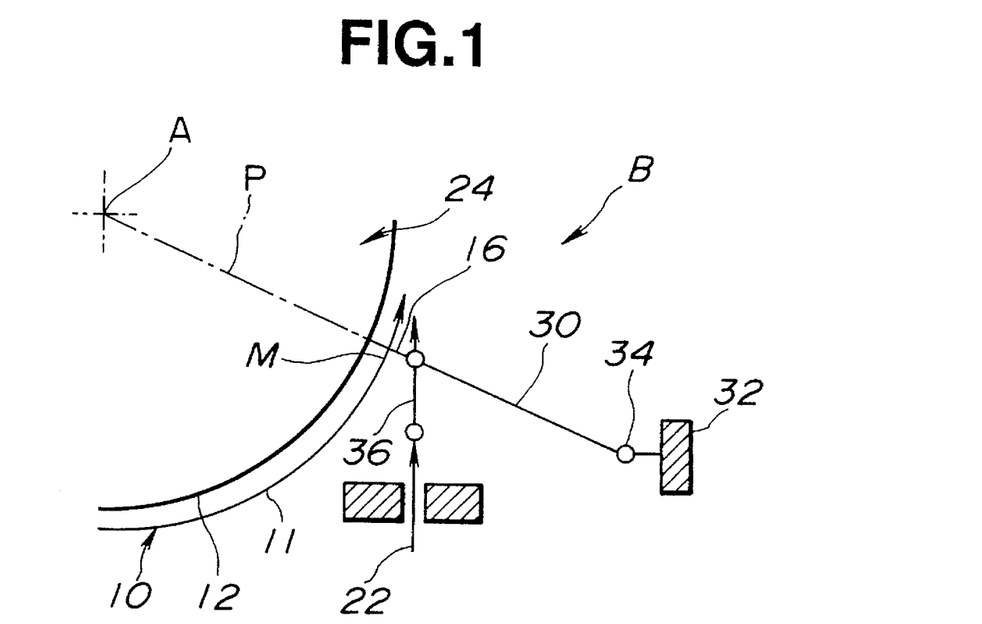
FIG. 1 is a fragmentary schematic illustration of a first embodiment of a band brake device in accordance with the present invention.
Figure 2:
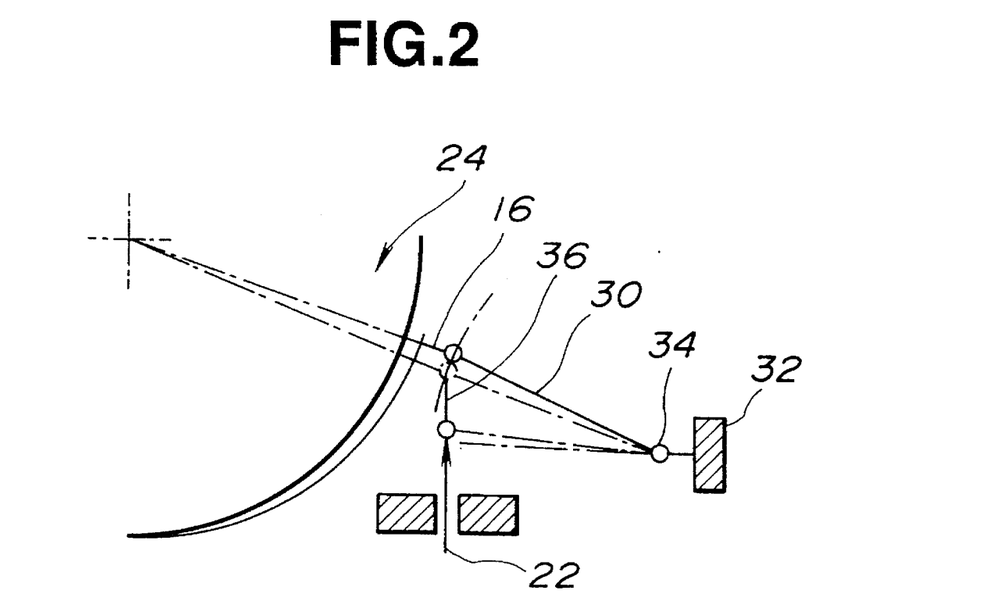
FIG. 2 is a fragmentary schematic illustration of the first embodiment band brake device but showing the operation of the band brake device.

Referring now to FIGS. 1 and 2 of the drawings, a first embodiment of a band brake device according to the present invention is illustrated by the reference character B. The band brake device B of this embodiment is used for braking a generally cylindrical rotating drum 24 in an automatic transmission (not shown) of an automotive vehicle. The band brake device B comprises a brake band 10 which is formed of a flexible steel band-like member or may be formed of a metal material fabricated generally annular. A lining material 12 is bonded to the inner surface of the brake band 10.

The brake band 10 is generally C-shaped in cross-section and has a fixed end (not shown) to which a fixed-side bracket (not shown) is fixedly secured by welding. An movable-side bracket 16 is fixed to an operating or movable end M of the brake band 10 by welding. It will be understood that the movable end is located near and opposite to the fixed end of the brake band. The brake band 10 is wrapped around the outer peripheral surface of the rotating drum 24, in which the fixed-side bracket is fixed to a fixed anchor end pin (not shown) secured to a casing or stationary member 32 of the automatic transmission whereas the movable-side bracket 16 is operatively connected to a piston 22 of a hydraulic servo device (not identified) through a strut 36.

The tip end of the movable-side bracket 16 is connected through a link 30 to a support section 34 of the casing 32. The link 30 is pivotally connected to the support section 34. It is preferable that the link 30 is generally band-shaped, and has an end which is connected to the support section 34, and has a sufficient width to increase a support force of the link 30 to the support section. This is because there is a possibility that the brake band 10 is one-sided when the braking action of the band brake device B is released, if the support force is low. Additionally, the center axis A, the axis of an end of the movable bracket 16, the center axis of the link 30 and the axis of the support section 34 are such arranged as to lie on a plane P in a state the brake band 10 is released from the drum 24 as shown in FIG. 1.

In operation, in order to tighten the brake band 10, the hydraulic servo device is operated to move the piston 22 so that a load is applied to the strut 36 in the direction of an arrow in FIG. 1. Accordingly, the movable-side bracket 16 is intended to move in the same direction as that of the arrow, and therefore the link 30 makes a rotational movement around its end connected to the support section 34 as indicated in FIG. 2. Consequently, the movable-side bracket 16 moves along a circle whose center is the supported end (connected to the support section 34) of the link 30. In other words, the movable-side bracket 16 is guided to move in a direction generally parallel with a tangential direction of the outer peripheral surface of the drum 24 at a position adjacent the movable-side bracket 16 or movable end M of the brake band 10. At the same time the link 30 exerts a force on the bracket 16 causing it to move along a circle around a point at which the link 30 is connected to stationary member 32. As a result, during braking, a load in the direction of the surface of the drum 24 is prevented from being applied to the operating end M of the brake band 10, so that the brake band 10 is tightened without developing a large bearing pressure between the brake band 10 and the surface of the drum 24.

Figure 3:
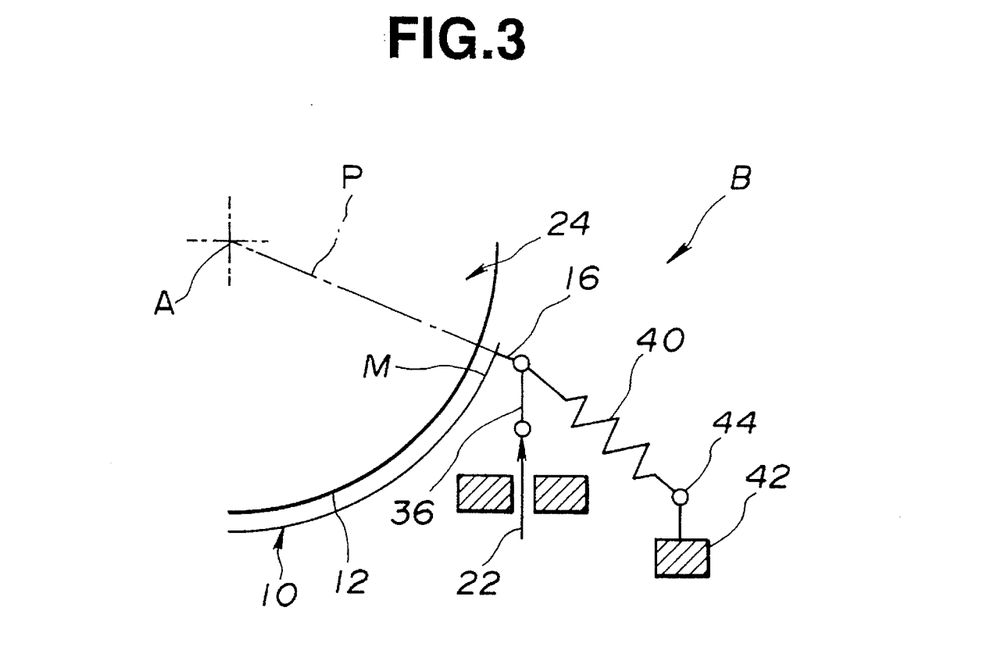
FIG. 3 is a fragmentary schematic illustration of a second embodiment of the band brake device in accordance with the present invention.

FIG. 3 illustrates a second embodiment of the band brake device B similar to the first embodiment band brake B. In this embodiment, the center axis A, the axis of the end section of the movable bracket 16, the center axis of the link 30 and the axis of the support section 34 do not lie on the plane P. In this case, a spring 40 is used to connect the movable-side bracket 16 and a support section 44 of a casing or stationary member 42, in place of the link 30 in the first embodiment. It will be understood that the movable-side bracket 16 is restrained in movement under the action of the component force of the spring 40.

Figure 4:
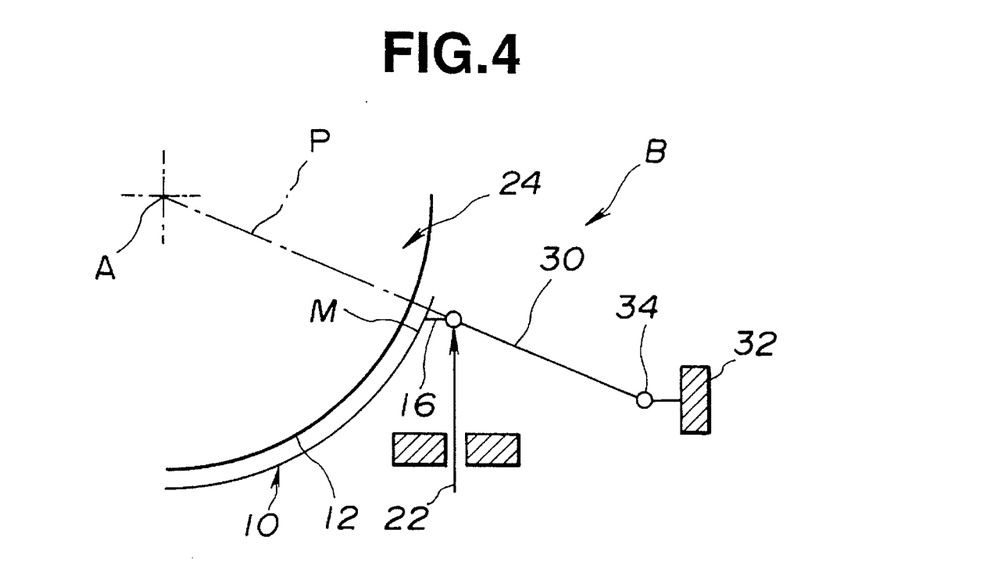
FIG. 4 is a fragmentary schematic illustration of a third embodiment of the band brake device in accordance with the present invention.

FIG. 4 illustrates a third embodiment of the band brake device of the present invention, similar to the first embodiment with the exception that the movable-side bracket 16 is directly moved by the piston 22 without using the strut 36 in the first embodiment.

Figure 5:
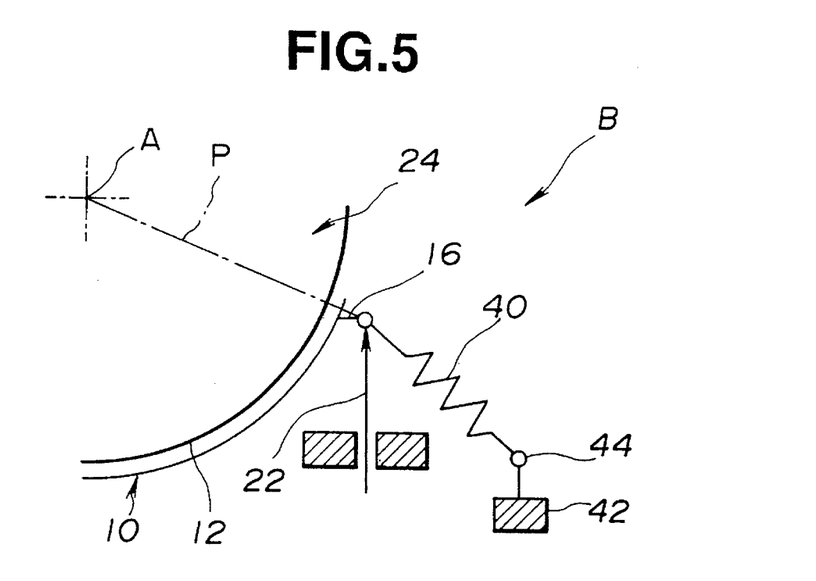
FIG. 5 is a fragmentary schematic illustration of a fourth embodiment of the band brake device in accordance with the present invention.

FIG. 5 illustrates a fourth embodiment of the band brake device B of the present invention, similar to the second embodiment with the exception that the movable-side bracket 16 is directly moved by the piston 22 without using the strut 36 in the first embodiment.

Figure 6:
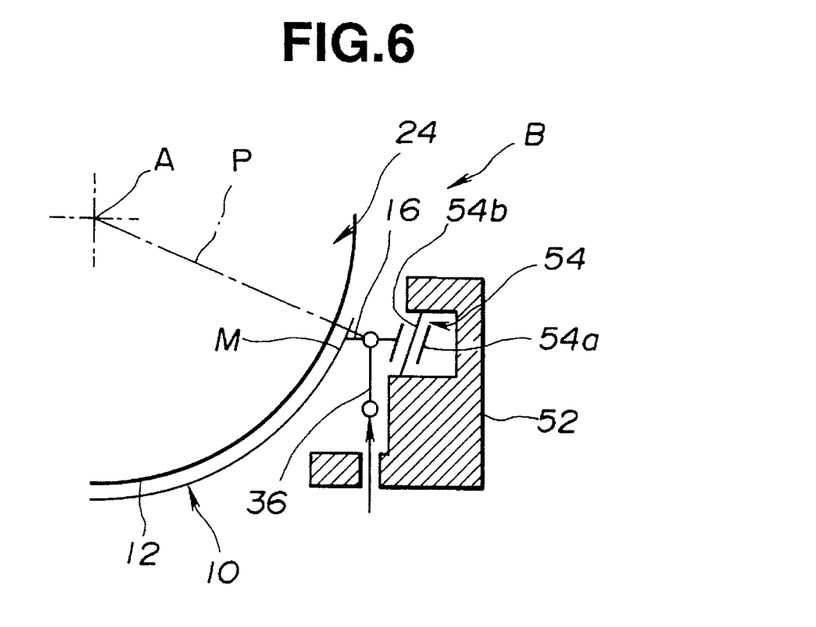
FIG. 6 is a fragmentary schematic illustration of a fifth embodiment of the band brake device in accordance with the present invention.

FIG. 6 illustrates a fifth embodiment of the band brake device B of the present invention, which is similar to the first embodiment. In this embodiment, the movable-side bracket 16 extends and is connected at its one end with a slide member 54a of a guide device 54. The slide member 54a is slidable along a guide member 54b of the guide device 54. The guide member 54a is supported by a casing or stationary member 52 and is extended in a direction generally parallel with a tangential direction of the outer periphery of the drum 24 at a position passing through the plane P or adjacent the movable-side bracket 16. The strut 36 is connected to the movable-side bracket 16. Accordingly, during braking, the movable bracket 16 can be guided in the direction generally parallel with the tangential direction of the outer periphery of the drum 24 at the position passing the plane P.

Figure 7:
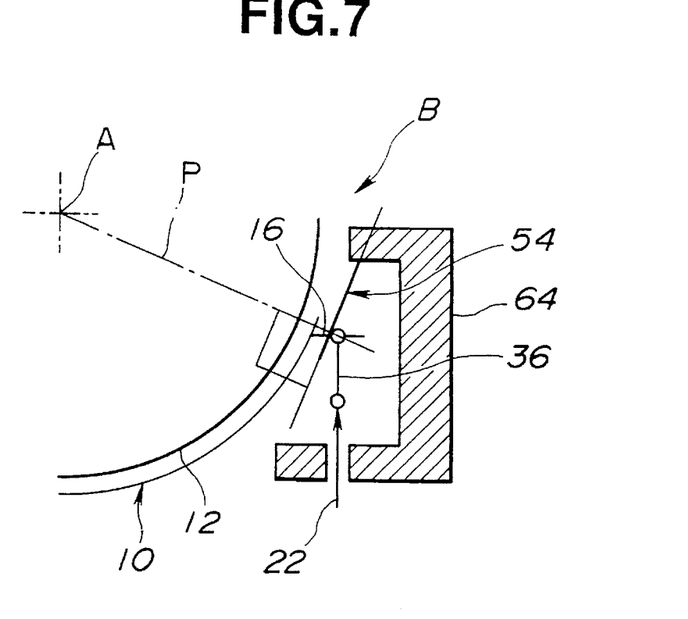
FIG. 7 is a fragmentary schematic illustration of a sixth embodiment of the band brake device in accordance with the present invention.
Figure 8:
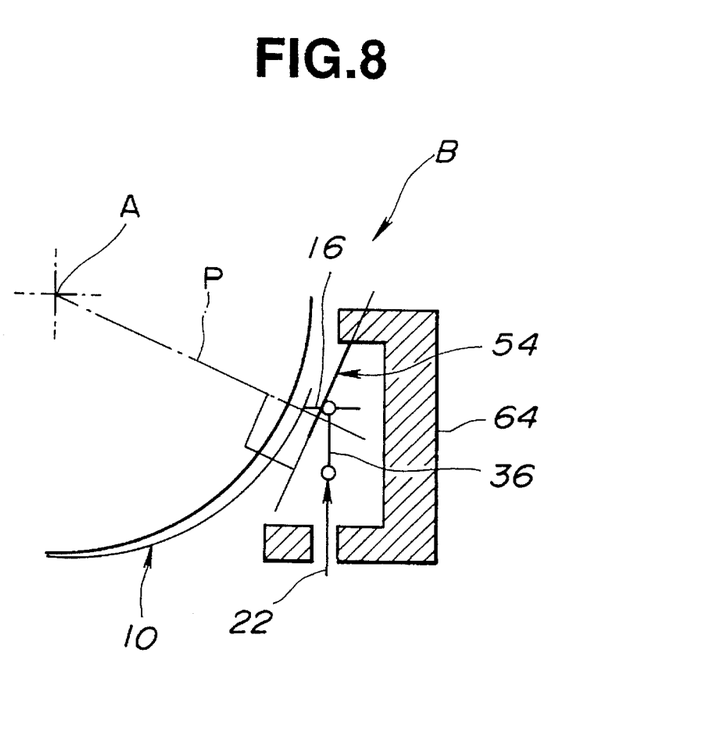
FIG. 8 is a fragmentary schematic illustration similar to FIG. 7 but showing the operation of the sixth embodiment band brake device.

FIGS. 7 and 8 illustrate a sixth embodiment of the band brake device B according to the present invention, which is similar to the fifth embodiment. In this embodiment, the movable-side bracket 16 is arranged to be guidable at its inside section located between an end connected to the brake band 10 and a connecting portion C to which the strut 36 is connected, by the guide device 54. The guide device 54 is arranged to allow the movable-side bracket 16 to be slidably movable in a direction generally parallel with the tangential direction of outer the periphery of the drum 24 at a position adjacent the movable end M of the brake band 10.

Accordingly, when the brake band 10 is tightened upon application of load from the piston 22 to the movable-side bracket 16 in the axial direction of the piston 22, the movable bracket 16 is moved in the direction generally parallel with the tangential direction of the periphery of the drum 24 at the position adjacent the brake band movable end M upon being guided by the guide device 54. As a result, no load is applied from the brake band movable end M toward the peripheral surface of the drum 24, so that the brake band 10 is tightened preventing a large bearing pressure to be locally applied to the outer periphery of the drum 24.

Figure 9:
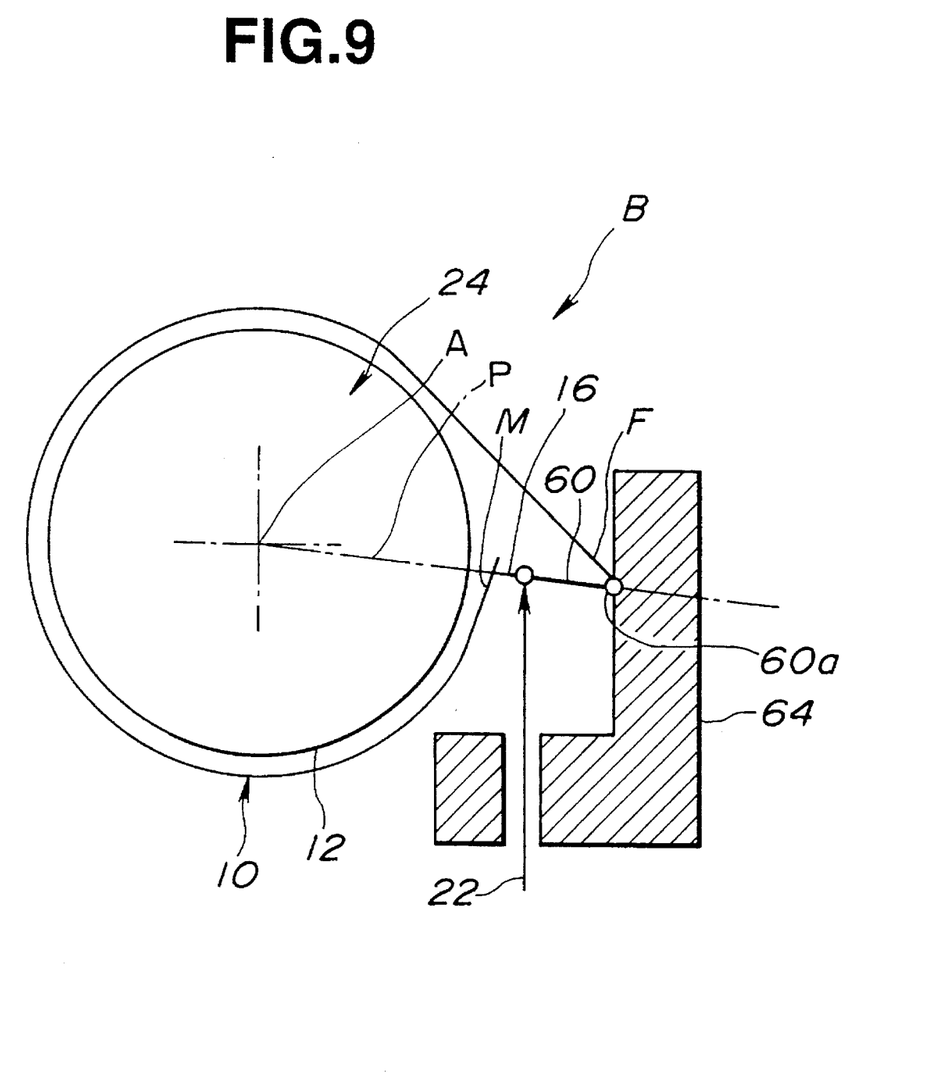
FIG. 9 is a schematic illustration of a seventh embodiment of the band brake device in accordance with the present invention.

FIG. 9 illustrates a seventh embodiment of the band brake device B according to the present invention, which is similar to the first embodiment. In this embodiment, the strut 16 is connected to a link 60 whose one end 60a is pivotally connected to the casing 64. Additionally, the fixed end F of the brake band 10 is connected to a portion of the pivotal end 60a so that the fixed end F is slightly rotatably movable with the pivotal movement of the link 60. Accordingly, the fixed-side end F of the brake band 10 is adapted to be slightly movable in a direction generally parallel with the tangential direction of the outer periphery of the drum 24, similarly to the movable end M. With this embodiment, load or pressure is prevented from being locally applied to the drum peripheral surface at positions adjacent to the movable and fixed ends M, F of the brake band 10. Thus, a large bearing pressure is prevented from being applied to the particular portions of the outer periphery of the drum 24.

Figure 10:
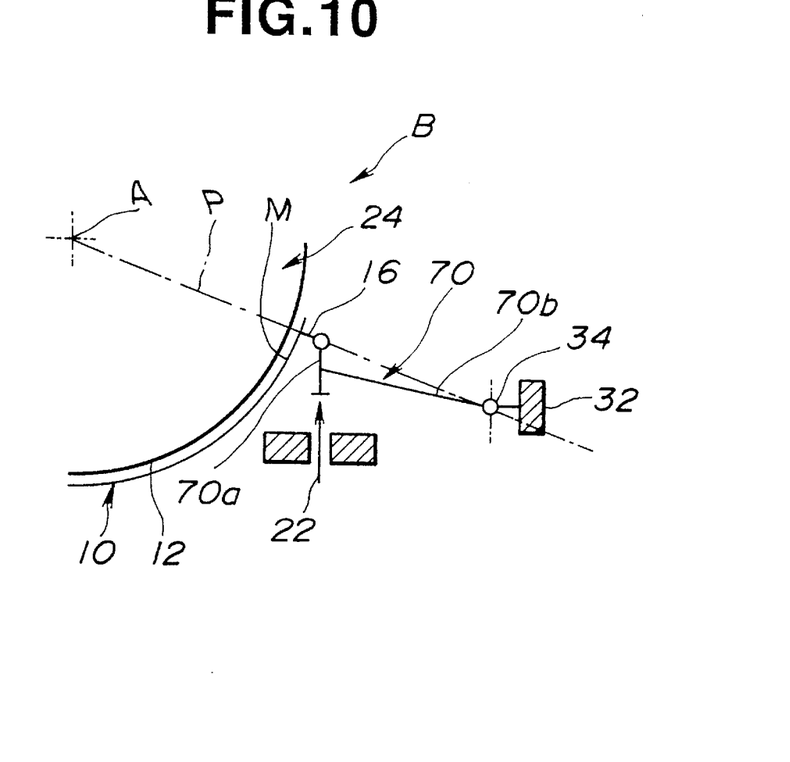
FIG. 10 is a fragmentary schematic illustration of an eighth embodiment of the band brake device in accordance with the present invention.

FIG. 10 illustrates an eighth embodiment of the band brake device B according to the present invention, which is similar to the first embodiment with the exception that a one-piece link member 70 is used in place of the separate strut 36 and link 30 of the first embodiment. The one-piece link member 70 includes a strut section 70a and a link section 70b which are integral with each other. The strut section 70a has an upper end connected to the movable-side bracket 16, and a lower end to which load is applied from the piston 22. The link section 70b is connected at its one end with the support section 34 of the casing 32. In this embodiment, the center axis A, the end (to which the upper end of the link member strut section 70a is connected) of the movable-side bracket 16 and the axis of the end (to which the link member link section 70b is connected) of the support section 34 are such arranged as to lie on a plane P.

Figure 11:
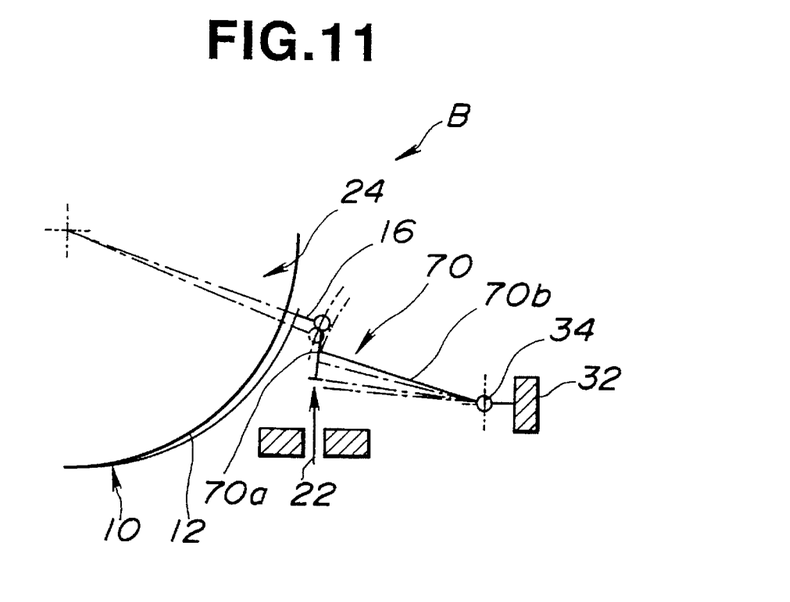
FIG. 11 is a fragmentary schematic illustration similar to FIG. 10 but showing the operation of the eighth embodiment band brake device.

In operation, when an axial load is applied from the piston 22 to the link member strut section 70a to fasten the brake band 10 around the outside of the rotating drum 24 as shown in FIG. 10, the one-piece structure link member 70 makes its rotational movement around its end connected to the support section 34 as shown in FIG. 11. As a result, the movable-side bracket 16 is pushed by the strut section 70a of the link member 70, and therefore moves in a direction generally parallel with the tangential direction of the outer periphery of the drum 10 as indicated in FIG. 11. Accordingly, no load is applied from the movable end M of the brake band 24 to the outer peripheral surface of the drum 10, so that a large bearing pressure is prevented from being applied to the special portion of the drum outer peripheral surface during application of braking force to the drum 24.

Figure 12:
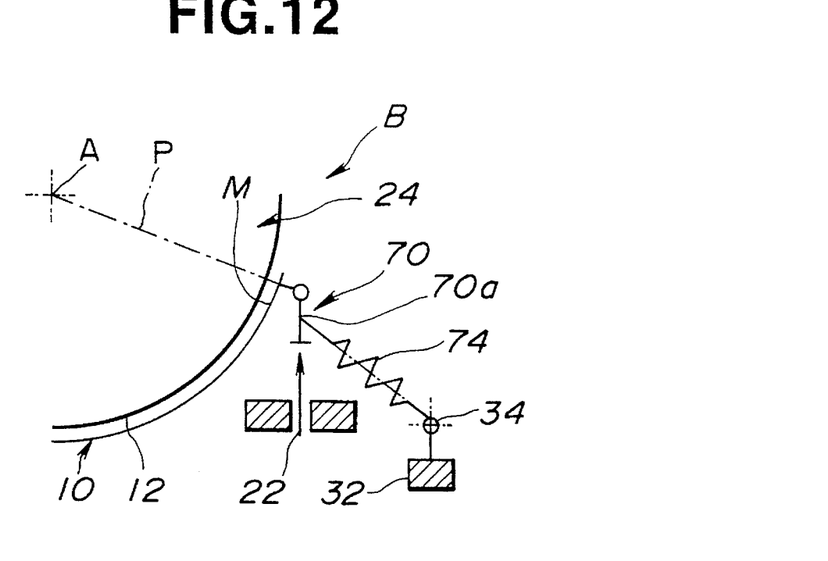
FIG. 12 is a fragmentary schematic illustration of a ninth embodiment of the band brake device in accordance with the present invention.

FIG. 12 illustrates a ninth embodiment of the band brake device of the present invention, similar to the eighth embodiment of FIG. 8 with the exception that a spring 74 is used in place of the link section 70b of the one-piece structure link member 70 of the eighth embodiment. In this embodiment, the axis of the spring 74 is not aligned with the plane P passing though the center axis A and the upper end (to which the movable-side bracket 16 is connected) of the link member strut section 70a.

Figure 13:
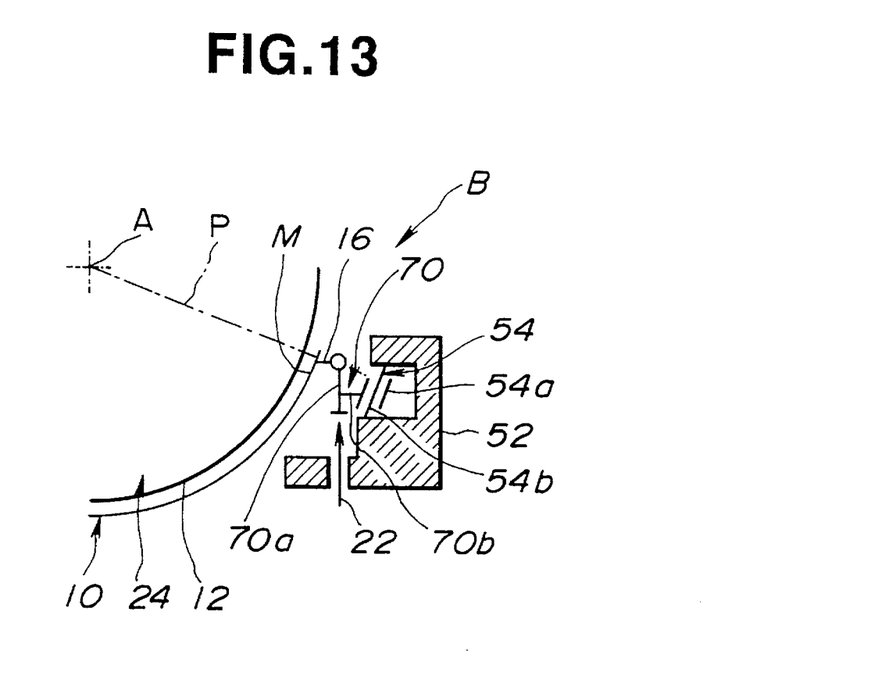
FIG. 13 is a fragmentary schematic illustration of a tenth embodiment of the band brake device in accordance with the present invention.

FIG. 13 illustrates a tenth embodiment of the band brake device B of the present invention, similar to the fifth embodiment of FIG. 6 with the exception that the one-piece structure link member 70 is used to connect the movable-side bracket 16 with the slide member 54a of the guide device 54. The strut section 70a of the link member 70 is connected at its upper end with the movable-side bracket 16, and at its lower end with the piston 22. Accordingly, the movable-side bracket 16 can be moved in a direction generally parallel with the tangential direction of the outer periphery of the drum 24 at the portion adjacent the movable-side end M of the brake band 10 upon being guided by the guide device 54.

Figure 14:
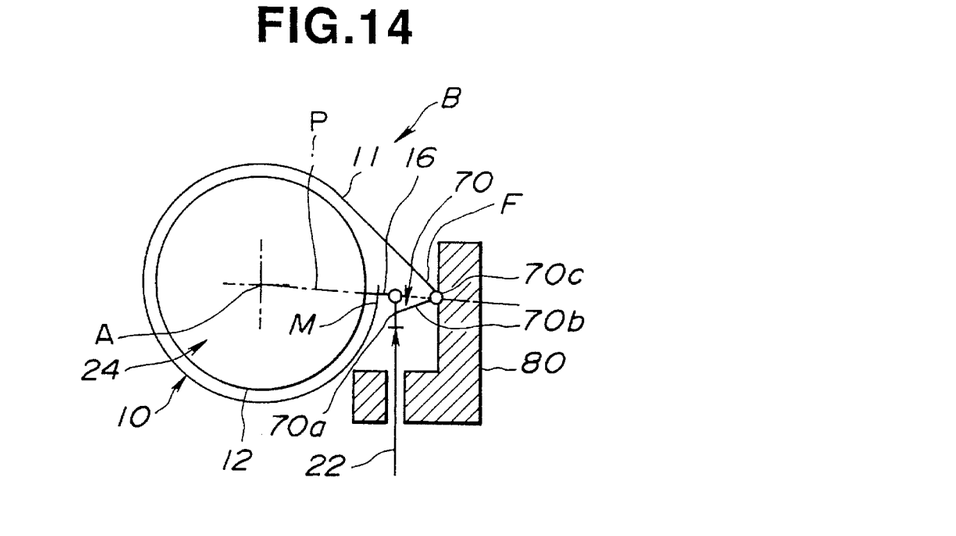
FIG. 14 is a schematic illustration of an eleventh embodiment of the band brake device in accordance with the present invention.

FIG. 14 illustrates an eleventh embodiment of the band brake device B of the present invention, similar to the eighth embodiment of FIG. 10. In this embodiment, the end 70c (connected to the casing 80) of the link section 70b of the one-piece structure link member 70 is pivotally secured to a casing or stationary member 80. Additionally, the fixed end F of the brake band 10 is connected to a portion of the pivotal end 70c of the link section 70b, so that the fixed end F is slightly rotationally moved with the pivotal movement of the link section 70b. Accordingly, the fixed end F can be also moved in the direction generally parallel with the tangential direction of the outer peripheral surface of the drum 24 at the position adjacent the fixed end F.

Figure 15:
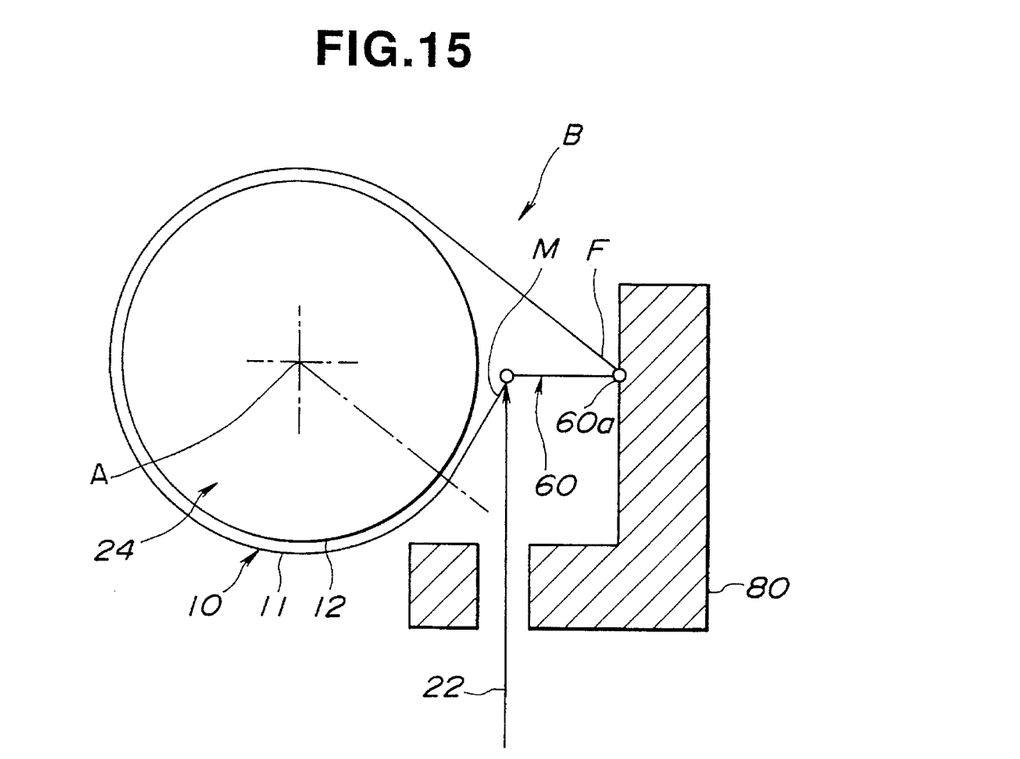
FIG. 15 is a schematic illustration of a twelfth embodiment of the band brake device in accordance with the present invention.

FIG. 15 illustrates a twelfth embodiment of the band brake device B according to the present invention, similar to the seventh embodiment of FIG. 9. In this embodiment, the movable-side end M is directly connected to one end of the link 60, so that the load from the piston 22 is directly applied the end of the link 60. Also in this embodiment, the fixed end F of the brake band 10 is connected to the pivotal end 60a of the link 60 so that the fixed end F is also moved generally in the direction parallel with the tangential direction of the outer peripheral surface of the drum 24 at the position adjacent the fixed end F.

What is claimed is:

1. A band brake device comprising:

a brake band wrapped around an outer peripheral surface of a rotatable drum, said brake band having a first end to which a movable-side bracket is connected, and a second end connected to a stationary member;

a piston of a hydraulic servo device, said piston being operatively connected to said movable-side bracket so that a load is applied from said piston to said movable-side bracket; and means for guiding said movable-side bracket to move in a direction generally parallel with a tangential direction of the rotatable drum at a position adjacent said movable-side bracket when said movable-side bracket receives the load from said piston, said guiding means including means for shifting said movable-side bracket relative to an axis of said piston in a direction away from the outer peripheral surface of said rotatable drum when said movable-side bracket receives the load from said piston.

2. A band brake device as claimed in claim 1, wherein said guiding means includes a link having a first end connected to said movable-side bracket, and a second end pivotally connected to the stationary member.

3. A band brake device as claimed in claim 2, wherein the second end of said brake band is connected to a portion of the second end of said link.

4. A band brake device as claimed in claim 1, further comprising a one-piece structure link member including a strut section through which said movable-side bracket is connected to said piston, and a link section integral with said strut section and having an end connected to the stationary member.

5. A band brake device as claimed in claim 4, wherein the end of the link section of said one-piece structure link member is pivotally connected to the stationary member, wherein the second end of said brake band is connected to a portion of the second end of said link.

6. A band brake device as claimed in claim 1, further comprising a lining material bonded to an inner surface of said brake band, said lining material being contactable with the outer peripheral surface of said rotatable drum.

7. A band brake device as claimed in claim 1, wherein said rotatable drum forms part of an automatic transmission of an automotive vehicle.

8. A band brake device as claimed in claim 1, wherein said guiding means includes a spring having a first end connected to said movable-side bracket, and a second end connected to the stationary member.

9. A band brake device as claimed in claim 1, wherein said guiding means includes a guide device installed to the stationary member, said movable-side bracket being operatively connected to said guide device in a manner to be guided in the direction generally parallel with and away from the tangential direction upon receiving the load from said piston.

10. A band brake device as claimed in claim 1, further comprising a strut through which said movable-side bracket is connected to said piston.

11. A band brake device comprising:

a brake band wrapped around an outer peripheral surface of a rotatable drum, said brake band having a first end to which a movable-side bracket is connected, and a second end connected to a stationary member;

a piston of a hydraulic servo device, said piston being operatively connected to said movable-side bracket so that a load is applied from said piston to said movable-side bracket; and means for guiding said movable-side bracket to move in a direction generally parallel with a tangential direction of said rotatable drum at a position adjacent said movable-side bracket when said movable-side bracket receives said load from said piston, said guiding means including means for shifting said movable-side bracket relative to an axis of said piston in a direction away from said outer peripheral surface of said rotatable drum when said movable-side bracket receives said load from said piston, said guiding means further including a rigid member having a first end connected to said movable-side bracket, and a second end pivotally connected to said stationary member so that said first end is rotatable around said second end.

* * * * *